US006484410B1

(12) United States Patent
Meastas

(10) Patent No.: US 6,484,410 B1
(45) Date of Patent: Nov. 26, 2002

(54) GUIDE FOR POWER TOOLS

(76) Inventor: Kenneth Ralph Meastas, 417 E. Virginia, Rialto, CA (US) 92376

( * ) Notice: Subject to any disclaimer, the term of this patent is extended or adjusted under 35 U.S.C. 154(b) by 0 days.

(21) Appl. No.: 09/971,886

(22) Filed: Oct. 4, 2001

(51) Int. Cl.[7] .......................... B23D 47/02; B23D 59/00; B27B 9/04

(52) U.S. Cl. ............................ 30/373; 30/375; 409/180

(58) Field of Search ........................... 30/373–375, 388; 409/180–182

(56) References Cited

U.S. PATENT DOCUMENTS

| | | | | | |
|---|---|---|---|---|---|
| 1,486,808 | A | | 3/1924 | Smith | |
| 2,676,624 | A | | 4/1954 | Gecmen | 143/43 |
| 2,748,811 | A | | 6/1956 | Chilton | 143/90 |
| 2,800,933 | A | * | 7/1957 | Michael | 30/373 |
| 4,335,512 | A | * | 6/1982 | Sheps et al. | 30/376 |
| 4,397,089 | A | * | 8/1983 | Pease | 30/373 |
| 4,453,312 | A | * | 6/1984 | Nishioka | 30/372 |
| 4,453,438 | A | | 6/1984 | Zelli | 83/745 |
| 4,483,071 | A | * | 11/1984 | te Kolsté | 30/376 |
| 4,509,398 | A | | 4/1985 | Mason | 83/745 |
| 4,628,608 | A | * | 12/1986 | Kuhlmann et al. | 30/373 |
| 4,751,865 | A | * | 6/1988 | Buckalew | 83/745 |
| 4,777,726 | A | * | 10/1988 | Flowers | 30/374 |
| 4,867,425 | A | | 9/1989 | Miraglia, Jr. | 269/1 |
| 4,945,799 | A | * | 8/1990 | Knetzer | 83/745 |
| 5,427,006 | A | * | 6/1995 | Finley | 83/477.2 |
| 5,815,931 | A | * | 10/1998 | Cleveland | 30/374 |
| 5,815,933 | A | | 10/1998 | Staniszewski | 30/376 |
| 6,349,712 | B1 | * | 2/2002 | Halstead | 30/371 |

* cited by examiner

*Primary Examiner*—M. Rachuba
*Assistant Examiner*—Jason Prone
(74) *Attorney, Agent, or Firm*—Sheldon & Mak; Jeffrey G. Sheldon

(57) ABSTRACT

A guide for guiding a power tool such as a circular saw has a planar deck, and two shoulders extending from opposed edges of the deck in diametrically opposite directions. The deck is provided with mounting fasteners for securely attaching the saw to the guide. There is an aperture in the deck for receiving the circular saw, the aperture being off center. By attaching the power tool to opposite sides of the guide it is possible to obtain straight cuts of different widths.

18 Claims, 3 Drawing Sheets

GUIDE FOR POWER TOOLS

BACKGROUND

Power tools such as circular saws are widely used by carpenters on construction sites. Because such saws are relatively compact and inexpensive, they are also now widely used by homeowners.

Often carpenters need to cut multiple strips of wood from large pieces of wood such as plywood. It is desirable that precise, straight, smooth cuts be obtained. When a power saw is free-hand guided it is nearly impossible to cleanly cut a workpiece precisely.

Various attempts have been made to develop guides for circular saws and other power tools. See, for example, the guides described in U.S. Pat. No. 4,453,438 and the various saw guides described therein.

Preexisting guides can suffer from one or more disadvantages. For example, they tend to be complex. For many carpenters, all that is needed is a guide to be repeatedly used to make consistent cuts of standard widths, such as 2, 3, or 4 inches. Attempts to make one guide that fits all leads to complexity, undue expense, and difficulty in use. Among other drawbacks found in preexisting guides are some are not able to make accurate long cuts, some are relatively slow and cumbersome to use, some require a clamp, and some are relatively fragile and are subject to warping.

Thus, there is a need for a simple, inexpensive, easy to use, sturdy guide for power tools such as circular saws that can be used to quickly make accurate long cuts in a multitude of standard sizes.

SUMMARY

The present invention is directed to a guide which satisfies this need. The guide comprises a planar deck having a longitudinal axis and opposed edges on opposite sides of the longitudinal axis, the edges being substantially parallel to the longitudinal axis. First and second shoulders extend from opposed edges of the deck in diametrically opposite directions. The shoulders are adapted for sliding movement between the workpiece and the guide when the power tool is working on the workpiece. There is an aperture in the planar deck for receiving a working element, such as a saw blade, of the power tool. The aperture is off center, being closer to the first shoulder than the second shoulder. The guide includes mounting fasteners for securely attaching the guide to the power tool. There are a plurality of mounting openings in the planar deck for receiving the mounting fasteners for attachment of the power tool thereto. Typically a power tool is provided with a base plate having mounting holes therein for receiving the mounting fasteners. The mounting openings are sized and positioned to provide at least first and second different working positions for positioning the working element of the power tool at different distances from the edge of the workpiece. Thus, merely by flipping over the guide and refastening it to the power tool, it is possible to obtain cuts of different widths.

An exemplary version of the invention useful with a SKIL™ brand circular power saw, includes a base plate that has two spaced apart mounting holes. The aperture in the planar deck of the guide is a slot. The guide mounting openings comprise a plurality of pairs of mounting openings. There are two pairs of mounting openings on one side of the slot and one pair of mounting openings on the other side of the slot, so spaced that they provide three different pre-determined cutting distances. Therefore, merely by flipping the guide over there is provided different pre-determined cutting distances for the saw.

In one version of the invention, the mounting fasteners have a body and a head, such as a bolt. Preferably the mounting openings are chambered to receive the head flush with the deck for smooth and easy movement along the workpiece.

DRAWINGS

These and other features, aspects and advantages of the present invention will become better understood from the following description, appended claims, and accompanying drawings where:

Figures 1, 2:
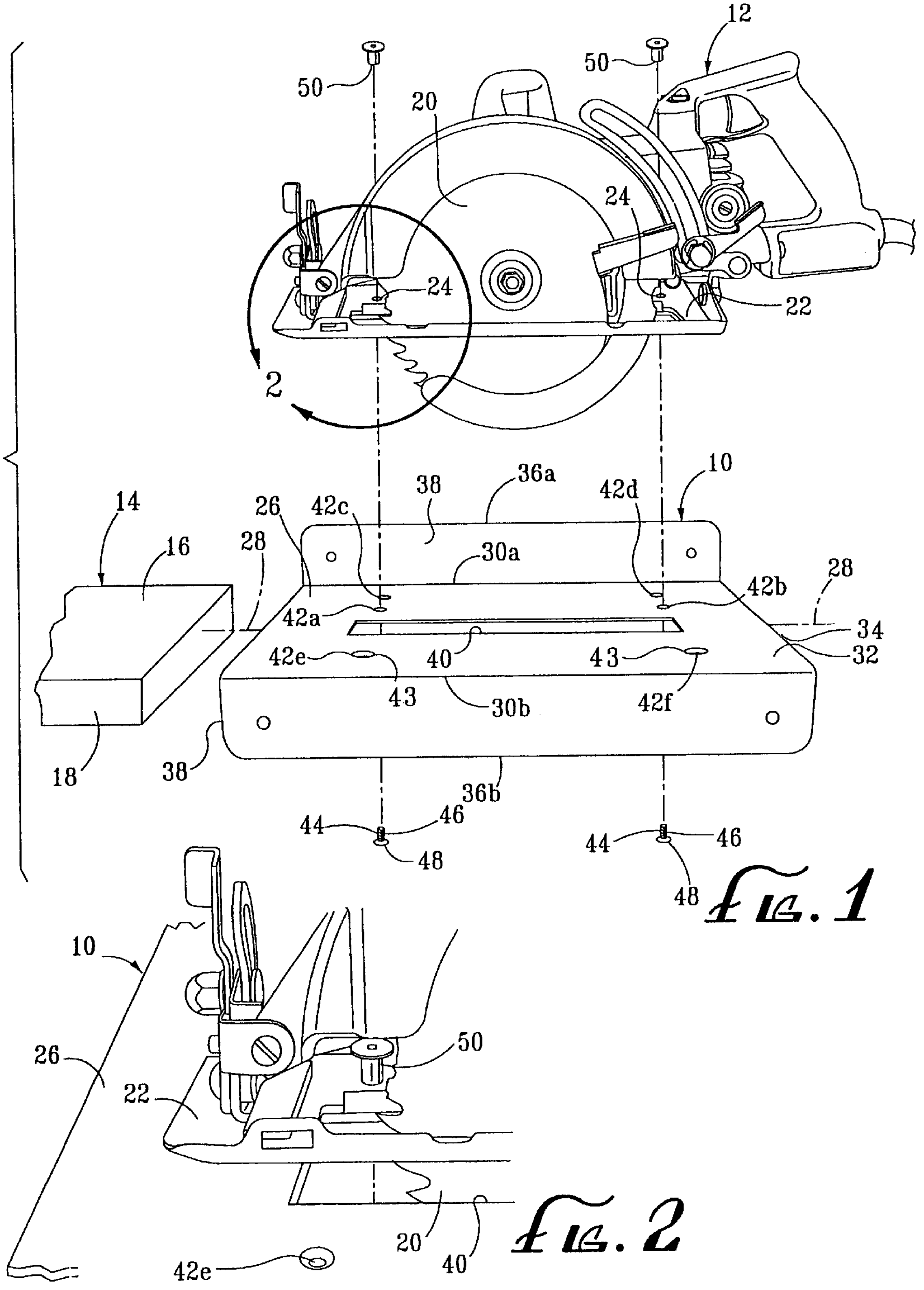
FIG. 1 is an exploded perspective view of a guide according to the present invention, also showing how a circular saw can be mounted on the guide.
FIG. 2 is a detailed perspective view in region 2 of FIG. 1 showing how the guide of FIG. 1 is attached to the power saw.
Figure 3A:
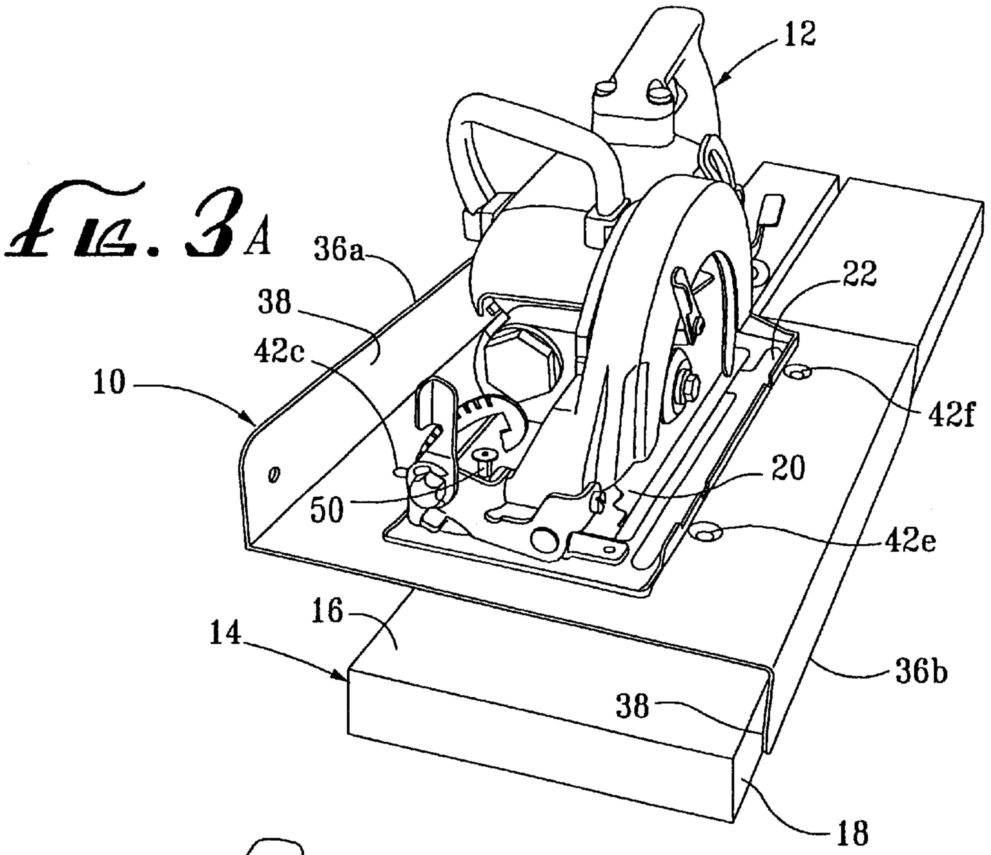
Figure 3B:
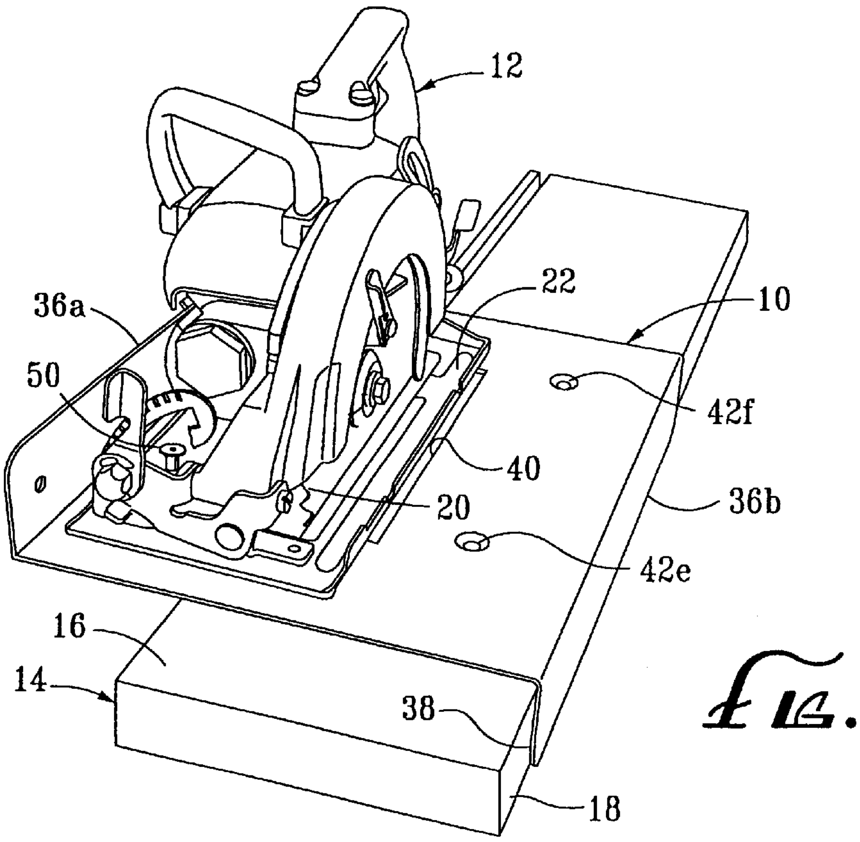
Figure 3C:
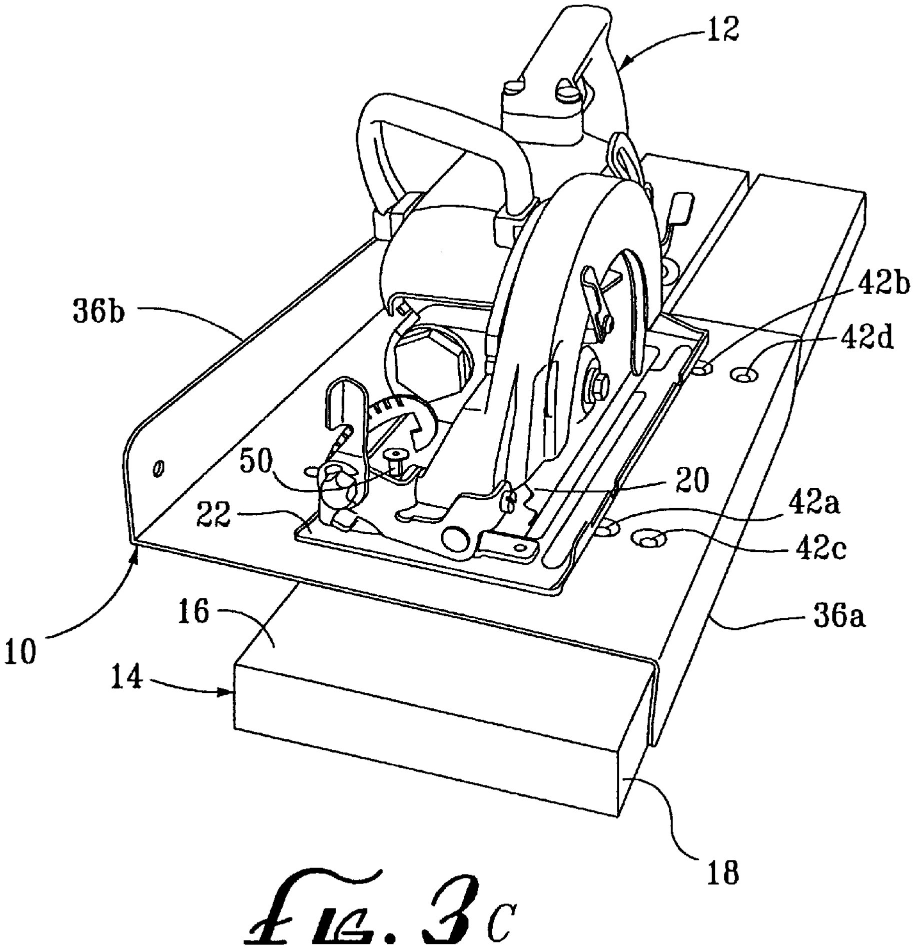
Figure 4:
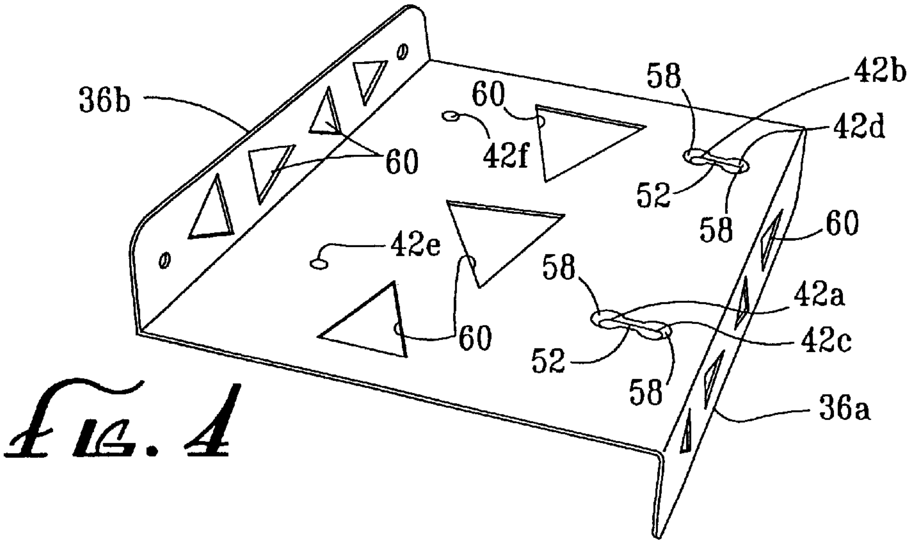

FIGS. 3A, 3B, and 3C are perspective views showing the guide of FIG. 1 with a circular saw attached thereto being used to cut a piece of lumber; and FIG. 4 is a top plan view of a portion of an alternate version of a guide according to the present invention showing an alternate mounting system.

DESCRIPTION

With reference to FIGS. 1 and 2, a guide 10 embodying features of the present invention is suitable for guiding a power tool such as a portable power saw 12 along a workpiece 14 to be cut. The workpiece 14 has a surface 16 to be cut and an edge surface 18.

The portable power saw 12 shown in the drawings is typical of the most popular models in the American marketplace, a SKIL™ brand portable saw. Typical of such power tools it has a working element, in this case a circular saw blade 20 mounted to rotate through a base plate 22. The base plate 22 is provided with two mounting holes 24.

The guide 10 comprises a planar deck 26 that has a longitudinal axis 28 and first 30*a* and second 30*b* opposed edges on opposite sides of the longitudinal axis 28 and substantially parallel to the longitudinal axis 28. The deck 26 has an upper surface 32 and a lower surface "34," pointing to the bottom surface, to FIG. 1. "Upper" and "lower" is only with reference to the figures, and as will become clear below, either surface can be upper or lower in use. Both the upper 32 and lower surfaces 34 are substantially flat so that they are adapted to slide along and contact the edge surface 18 of the workpiece 14 during the cutting process.

The guide also includes first 36*a* and second 36*b* planar shoulders that extend from the first 30*a* and second 30*b* edges, respectively, but in diametrically opposite directions. Thus, with reference to FIG. 1, the first shoulder 36*a* extends upwardly, and the second shoulder 36*b* extends downwardly. Each shoulder 36 is in a plane that is substantially perpendicular to the plane of the deck 26. Each shoulder 36 has an inner surface 38 which provides a blade guide adapted to provide a predetermined line of cut and to guide the saw blade 20 therealong. The inner surfaces 38 preferably are smooth, flat, and are adapted to contact the edge surfaces 18 of the workpiece 14 during the cutting operation.

There is a cutting aperture, such as a slot 40, in the deck 26 of the guide 10. The slot 40 is sized so that the saw blade 20 can extend therethrough when cutting, as shown in FIG. 2.

The slot 40 can be of any size or configuration, as long as the saw blade 20 or other working element can move freely therein. For example, if the power tool is a jig saw, a much smaller aperture is required than for a circular blade.

The slot 40 is off center, i.e., it is closer to the first edge 30*a* and first shoulder 36*a* than the second edge 30*b* and second shoulder 36*b* of the deck 26. This allows for different width cuts to be made, as described in detailed below.

There are a plurality of mounting openings 42 in the deck 26 for securely attaching the base plate 22 of the saw 12 thereto. In the version shown in FIGS. 1 and 2, the mounting open comprise six openings 42*a*, 42*b*, 42*c*, 42*d*, 42*e*, and 42*f*. The mounting openings 42*a* are about the same size and shape as the mounting holes 24. They are positioned to provide multiple cutting positions for the guide so that different widths can be cut from the workpiece 14. The mounting openings 42 are in pairs, namely, a first pair of mounting openings 42*a* and 42*b*, a second pair of mounting openings 42*c* and 42*d*, and a third pair of mounting openings 42*e* and 42*f*. As will be appreciated by those skilled in the art, fewer or more than three pairs of openings 42 can be used. Moreover, the openings 42 can be spaced apart from each other or configured as is necessary, depending upon the location of the mounting holes 24 and the particular tool being used with the guide 10. They are located relative to the slot so that when they are in use, the blade 20 extends through the slot 40.

Only one pair of the mounting openings is used at a time for mounting the saw. For example, when the first pair is used, as shown in FIG. 3A, the first shoulder 36*b* is up against edge surface 18 of the workpiece 14, and the blade 20 is a preselected distance from that shoulder, and in this case 6 inches. When the second pair 42*c* and 42*d* of the mounting openings is used, as shown in FIG. 3B, again the first shoulder 36*b* is against the edge surface 18 of the workpiece 14, and in this case the distance from the edge of the workpiece to the blade 20 is about 8 inches. When the third pair of mounting openings 42*e* and 42*f* is used, as shown in FIG. 3C, the guide 10 is flipped over, and the second shoulder 36*b* is up against the edge surface 18 of the workpiece 14, and the distance from the blade 20 to the edge of the workpiece is about 4 inches.

The guide 10 is held in place by mounting fasteners. In the embodiment shown in the drawings, the mounting fasteners can comprise a threaded bolt 44 having a body 46 and head 48 that is received in a correspondingly threaded socket 50. Bolt head 48 accommodates a Phillips head screwdriver, and the socket is designed for an allen wrench. The body 46 of the bolt 44 extends through aligned mounting openings 42 and mounting holes 24, and are threaded into the socket 50, for tightening in a desired position.

Preferably the edge 43 of each mounting opening 42 that receives the bolt head 48 is chambered to receive the head 48 so that it is substantially flush with the deck 26, for easy movement of the guide along the workpiece.

In an alternate version of the invention, shown in FIG. 4, first and second pair of mounting openings can be replaced with elongated mounting slots 52 that include nests 58, the nests 58 being sized to receive the bolt heads. The slot is sufficiently wide that the body 46 of the bolt 44 can slide therein. This allows the position of the guide relatively to the cutting blade to be changed without complete disassembly, i.e., all is necessary is to loosen up the fasteners. The nests provide secure connection to prevent slippage during use.

The guide has cutouts 60, which are optional. They reduce weight. The cutouts can be of any size, shape, and any location, as long as the structural integrity of the guide 10 is not compromised. For example, although FIG. 4 shows the use of triangular-shaped cutouts, the cutouts can be circular.

The guide can be made of many materials, including metals and plastics. Among the metals that can be used are aluminum and galvanized steel. If galvanized steel is used, the preferred gauge is 14. The plastic used preferably is a structural plastic, such as DELRIN™ brand acetate resin.

The guide 10 can be made of one piece. With plastics, it can be injection molded. For a metal piece, a piece of appropriate size sheet metal can have the holes punched out of it, and then the shoulders can be formed by bending the edges in the appropriate jig.

The deck can be provided with indicia to indicate the width of cut that is made with the guide depending on which mounting openings 42 are used preferably the indicia is placed proximate to the openings.

Mounting fasteners other than the bolt and socket system described can be used. For example, a bolt with a wing nut, although less preferred, may be appropriate under some circumstances. Also, a bolt with a conventional nut, with or without a washer, can be used.

For work tools that do not have the necessary mounting holes, a user can drill such holes up, or obtain a retrofit base plate.

Although the present invention has been described in considerable detail with reference to certain preferred versions thereof, other versions are possible. For example, the deck need not be rectangular, but can be any configuration as long as the opposed edges 30 are parallel to the axis of the slot 40 to obtain a straight cut.

Therefore, the scope of the appended claims should not be limited to the description of the preferred versions contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Also, any element in a claim that does not explicitly state "means for" performing a specified function or "step for" performing a specified function, should not be interpreted as a "means" or "step" clause as specified in 35 U.S.C. § 112.

What is claimed is:

1. A guide for guiding a portable power saw along a workpiece to be cut during the sawing thereof, the workpiece having a surface to be cut and an edge surface, the saw having a blade and a baseplate, the baseplate having at least two mounting holes therein, the guide comprising:

a) a planar deck having a longitudinal axis and opposed edges on opposite sides of the longitudinal axis and substantially parallel to the longitudinal axis, the deck being adapted to contact the workpiece surface to be cut;

b) first and second flat shoulders extending from the opposed edges of the deck in diametrically opposite directions, each shoulder being in a respective plane that is substantially perpendicular to the plane of the deck, each shoulder having an inner face which provides a blade guide adapted to provide a predetermined line of cut and to guide the blade therealong, each inner face being adapted to contact the edge surface of the workpiece;

c) a slot in the planar deck sized so that the blade extends therethrough for cutting when the saw baseplate is on the planar deck, the slot being closer to the first shoulder than the second shoulder;

d) mounting fasteners for securely attaching the guide to the planar deck; and e) a plurality of mounting openings in the planar deck for receiving the mounting fasteners, the openings being sized and positioned to provide at least first and second cutting positions, wherein for each cutting position at least two baseplate mounting holes are aligned with corresponding mounting holes for receiving the mounting fasteners to securely attach the saw to the guide, and wherein in the first cutting position there is a first cutting distance between the blade and the inner face of the first shoulder and in the second cutting position there is a second cutting distance between the blade and the inner face of the second shoulder, the first and second distances being different, so that by flipping the guide over there is provided different pre-determined cutting distances for the saw.

2. The guide of claim 1 wherein the saw baseplate has a longitudinal axis and the saw mounting holes are longitudinally spaced apart from each other, and the mounting openings comprise pairs of mounting openings about the same size as the mounting holes, there being at least one pair on each side of the slot.

3. The guide of claim 2 wherein there are at least two pairs of mounting openings on one side of the slot, thereby providing at least three different pre-determined cutting distances.

4. The guide of claim 1 made of one piece.

5. The guide of claim 1 wherein the mounting fasteners have a body and a head, and at least two of the mounting openings comprise an elongated mounting slot with nests along the length thereof for receiving the head of a mounting fastener, the width of the mounting slots being large enough so that the position of the saw on the guide plate can be adjusted without removing the fasteners from the mounting slots and mounting holes.

6. The guide of claim 1 wherein the mounting fasteners comprise a bolt and socket, the socket being tightenable with an allen wrench.

7. The guide of claim 1 wherein the mounting fasteners have a body and a head and the mounting holes are chambered to receive the head of the mounting fasteners substantially flush with the planar deck.

8. A method for cutting a cutting a strip of pre-determined with from a workpiece, the method comprising the steps of:

a) selecting the guide of claim 1;

b) selecting a power saw having a blade and a baseplate, the baseplate having at least two mounting holes therein;

c) placing the baseplate on the planar deck with the saw blade extending through the slot in the planar deck and with the mounting holes aligned with corresponding mounting openings;

d) securely attaching the guide to the planar deck with the mounting fasteners; and e) placing an inner face of the shoulder extending away from the power saw against an edge surface of the workpiece.

9. The combination of a power saw and the guide of claim 1 secured to each other with the mounting fasteners.

10. An article for guiding a power tool having a working element along a workpiece having an edge, the article comprising:

a) a planar deck having a longitudinal axis and opposed edges on opposite sides of the longitudinal axis and substantially parallel to the longitudinal axis;

b) first and second shoulders extending from the opposed edges of the deck in diametrically opposite directions, the shoulder being adapted for sliding movement between the edge of the workpiece and the article during the working on the workpiece by the power tool;

c) an aperture in the planar deck for receiving the working element, the aperture being closer to the first shoulder than the second shoulder;

d) mounting fasteners for securely attaching the guide to the power tool; and e) a plurality of mounting openings in the planar deck for receiving the mounting fasteners for attachment of the power tool thereto with the working element extending through the aperture, the opening being sized and positioned to provide at least first and second different working positions changeable by changing the shoulder in contact with the workpiece for positioning the working element at different distances from the edge of the workpiece.

11. The article of claim 10 wherein the mounting openings comprise pairs of mounting openings, there being at least one pair on each side of the slot.

12. The article of claim 10 wherein there are at least two pairs of mounting openings on one side of the slot, thereby providing at least three different pre-determined cutting distances.

13. The article of claim 10 made of one piece.

14. The article of claim 10 wherein the mounting fasteners have a body and a head, and at least two of the mounting openings comprise an elongated mounting slot with nests along the length thereof for receiving the head of a mounting fastener, the width of the mounting slots being large enough so that the position of the saw on the guide plate can be adjusted without removing the fasteners from the mounting slots and mounting holes.

15. The article of claim 10 wherein the mounting fasteners comprise a bolt and socket, the socket being tightenable with an allen wrench.

16. The article of claim 10 wherein the mounting fasteners have a body and a head and the mounting holes are chambered to receive the head of the mounting fasteners substantially flush with the planar deck.

17. A method for cutting a cutting a strip of pre-determined with from a workpiece, the method comprising the steps of:

a) selecting the article of claim 10;

b) selecting a power saw having a blade and a baseplate, the baseplate having at least two mounting holes therein;

c) placing the baseplate on the planar deck with the saw blade extending through the opening in the planar deck and with the mounting holes aligned with corresponding mounting openings;

d) securely attaching the article to the planar deck with the mounting fasteners; and e) placing an inner face of the shoulder extending away from the power saw against an edge surface of the workpiece.

18. The combination of a power saw and the article of claim 10 secured to each other with the mounting fasteners.

* * * * *